United States Patent [19]

Ashbee

[11] 4,238,214
[45] Dec. 9, 1980

[54] PARTICLE ORIENTATION METHOD

[76] Inventor: Kenneth H. G. Ashbee, 2 Druid Stoke Ave., Stoke Bishop, Bristol, United Kingdom, BS9 1DD

[21] Appl. No.: 41,326

[22] Filed: May 22, 1979

Related U.S. Application Data

[63] Continuation-in-part of Ser. No. 635,173, Nov. 25, 1975, abandoned.

[30] Foreign Application Priority Data

| Mar. 25, 1975 | [GB] | United Kingdom | 12496/75 |
| Mar. 25, 1975 | [GB] | United Kingdom | 12511/75 |
| May 16, 1975 | [GB] | United Kingdom | 20941/75 |
| Jun. 2, 1975 | [DE] | Fed. Rep. of Germany | 2524337 |
| Jun. 5, 1975 | [JP] | Japan | 50-67113 |

[51] Int. Cl.³ .................. B29D 3/02; C03B 19/00; C03B 32/00
[52] U.S. Cl. .................. 65/33; 65/121; 264/108
[58] Field of Search .......... 65/33, 121, DIG. 2, 65/13; 264/288.4, 289.3, 291, 108; 72/378, 271

[56] References Cited

U.S. PATENT DOCUMENTS

| 1,529,947 | 3/1925 | Freese | 65/121 |
| 2,319,816 | 5/1943 | Land | 65/DIG. 2 |
| 2,900,708 | 8/1959 | Pond | 65/121 X |
| 3,209,402 | 10/1965 | Riley et al. | 65/121 X |
| 3,218,143 | 11/1965 | DeLajarte | 65/121 X |
| 3,259,479 | 7/1966 | Tiede | 65/121 X |
| 3,791,806 | 2/1974 | Koizumi et al. | 65/121 X |
| 3,799,836 | 3/1974 | Rogers et al. | 65/33 X |
| 3,822,120 | 7/1974 | Koizumi et al. | 65/121 X |
| 3,881,945 | 5/1975 | Trojer et al. | 65/33 X |

FOREIGN PATENT DOCUMENTS

| 1020181 | 11/1952 | France | 65/121 |
| 1382374 | 11/1964 | France | 65/121 |
| 855393 | 11/1960 | United Kingdom | 65/121 |

OTHER PUBLICATIONS

Frank et al., "Polymer Chain Extension Produced by Impinging Jets", *Polymer*, 1971, vol. 12, pp. 467–473.
Mackley et al., "Flow Induced Crystallization of Polyethylene Melts", *Polymer*, 1973, vol. 14, pp. 16–20.
Ashbee, "Aniostropic Glass–Ceramics Produced by Extrusion . . .", *Journal of Material Science*, 1975, vol. 10, pp. 911–917.
Ashbee, "Oriented Glass Ceramic Fibre", *Nature*, Dec. 6, 1974, vol. 252, pp. 469 and 470.

*Primary Examiner*—Richard V. Fisher
*Attorney, Agent, or Firm*—Lewis H. Eslinger

[57] ABSTRACT

Glasses and other matrix phases containing asymmetrically shaped particles are converted into materials of improved mechanical strength by orienting the particles by introducing molten matrix containing the particles into an orientation zone and removing the molten matrix from the zone e.g. through at least one small orifice under conditions such that at the center of symmetry of the zone there is substantially no movement of the fluid molecules but in those regions of the zone spaced away from the centre of symmetry, there is extensional flow of the matrix molecules parallel to the direction of movement of the fluid stream(s) leaving the orientation zone whereby any asymmetrically shaped particles suspended in the flowing fluid become aligned parallel to the direction of movement of the stream(s) leaving the orientation zone.

10 Claims, 3 Drawing Figures

PARTICLE ORIENTATION METHOD

This application is a continuation-in-part of copending application Ser. No. 635,173 filed Nov. 25, 1975, now abandoned.

This invention relates to the orientation of particles in fluids and is particularly concerned with the production of anisotropic glass-ceramics.

Many materials, including certain glasses, may be looked upon as a substantially homogeneous matrix phase having entrained in the matrix phase asymmetrically shaped particles. In conventional methods of producing materials of this type, asymmetrically shaped particles are randomly oriented in the matrix phase. However, it is known that the physical properties of many materials of this type can be modified if the particles are oriented. In particular, identical orientation of the particles in many materials can impart considerable overall mechanical strength to the oriented material.

The use of longitudinal velocity gradients in a flowing system to extend and orient molecules within that system is known. Prior art workers have employed various extensional flow systems to achieve longitudinal velocity gradients and have thereby exercised an orienting influence on macromolecules within low viscosity fluid systems. Frank et al. (Polymer 12 (1971) 467) describe systems for orienting polyethylene molecules in xylene solutions and Mackley et al. (Polymer, 14 (1973) 16) describe systems for orienting molecules of melted high density polyethylene. In both systems the fluid being oriented by extensional flow is urged in some manner into dies wherein the desired extensional flow takes place.

Heretofore, however, it has not been possible to achieve the requisite degree of extensional flow and strain rates which are necessary to orient asymmetrically shaped suspended particles, in particular solid particles in a liquid matrix phase.

I have now found a method of orienting particles which can be used on a matrix phase containing orientable asymmetrically shaped particles. However, unlike the known extensional flow techniques mentioned above, my technique is particularly suited to high viscosity fluid matrices e.g. molten glass or molten uncured or partially cured epoxy resins. Consequently my method can be used to manufacture an aligned short fibre composite, such as glass fibre reinforced epoxy resin, in a single step operation.

The present invention provides a method of orienting asymmetrically shaped particles suspended in a fluid comprising the steps of: forcing a first stream of said fluid, under pressure, into a first conduit and forcing a second stream of said fluid, under pressure, into a second conduit in a direction opposite to said first stream, said conduits having parallel centerlines on a common axis; forcing the streams of said fluids into narrow, axial channels in each of said conduits, at the intersection of the said centerlines, such that said opposite-flowing axial streams meet at the intersection of centerlines under high biaxial pressure and such that the velocity of said streams falls to zero at said intersection; and removing said fluid from said intersection to a zone of lower pressure through a narrow bore, thereby subjecting said fluid to extensional flow under high strain rate and orienting the asymmetrically shaped particles in said fluid.

The present invention involves orienting particles in a normally liquid or molten matrix phase wherein a fluid comprising a matrix phase containing asymmetrically shaped and preferably solid particles is introduced into an orientation zone and removed from the orientation zone in at least one stream, the flow pattern in the orientation zone being such that at the centre of symmetry of the zone there is substantially no movement of the fluid molecules but in those regions of the zone spaced away from the centre of symmetry, there is extensional flow of the matrix molecules parallel to the direction of movement of the fluid stream leaving the orientation zone whereby any asymmetrically shaped particles suspended in the flowing fluid become aligned parallel to the direction of movement of the stream leaving the orientation zone.

When the arrangement is such that there is a single stream of fluid leaving the orientation zone, then in addition to the extensional flow of the matrix molecules mentioned above, there is also a rotational flow of the molecules. In some systems, depending upon the exact geometry of the asymmetric particles to be oriented, this rotational flow does not have deleterious effects on the mechanical properties of the oriented material. In most cases however, the rotational movement is undesirable and, in accordance with a preferred aspect of the invention, the fluid is removed from the orientation zone in at least two opposed streams. Under these circumstances, there is extensional flow of the matrix molecules parallel to the directions of movement of the opposed streams but substantially no rotational flow of the matrix molecules and the asymmetrically shaped particles then become rigorously aligned parallel to the directions of movement of the opposed streams.

In situations where the presence of rotational flow in the matrix molecules in acceptable, satisfactory fluid flow patterns can be achieved in a similar but rather simpler arrangement to that discussed above where one of the exits is deliberately blocked or is substituted by a reflector plate, and material is removed in a single stream through one exit.

The invention may be put into practice by introducing the fluid into the orientation zone by any convenient means and by removing the fluid, in accordance with the preferred aspect of the invention, through the bores of two opposed dies which are spaced apart from one another. These dies may be positioned so that their bores are on a common axis and in this way, it is possible to remove the fluid from the orientation zone in two opposed streams.

According to the preferred embodiment, which is described in greater detail below in connection with the drawings, a first stream of fluid is forced under pressure into a first conduit and a second stream of fluid is forced under pressure into a second conduit, the directions of flow of the first and second streams being opposite to one another. The conduits have parallel centerlines on a common axis. The streams of opposite-flowing fluid are forced into narrow, axial channels in each of the conduits by the geometry of the conduits themselves such that at the intersection of the centre lines of the conduits the opposite-flowing streams meet under extremely high biaxial pressure and the velocity of those streams falls to zero.

To either side of the point of intersection the velocity of the streams is also zero or very close to zero because the two narrowly confined axial streams exert substantially equal and opposite forces on each other. Then the fluid is removed from the intersection to a zone of lower pressure through at least one narrow, axial port in a direction perpendicular to the common axis of the conduits. The fluid is thereby subjected to extensional flow under extremely high strain rates and the asymmetrically shaped particles within the fluid are oriented.

I have found that the extensional flow which is characteristic of the orientation method of this invention occurs, not in the bore of the dies themselves but in the space between the dies. It is important to secure the extensional flow in the space between the dies and I have found that by appropriate spacing apart of the orifices of the dies, it is possible to secure appropriate flow patterns in the space. This means that at the centre of symmetry which is exactly half-way between the two orifices, there is substantially no molecular movement at all but that the desired type of molecular movement occurs in the regions between this centre of symmetry and the orifice to each die bore.

As a practical matter, it has been found that some measure of orientation takes place regardless of the exact distance between the orifice of the two die bores but that, to bring about a worthwhile degree of orientation, particularly in the neighbourhood of the axis of symmetry, it is usually desirable to have the distance between the orifices of the die bores not greater than 10 times the diameter of the bore of the die. As the distance between the orifices reduces, in relation to the diameter of the orifices, the degree of orientation improves and optimum results are usually obtainable when the distance is 0.1 to 2 times the diameter of the bore of the die. Particularly good results have been achieved using an orientation zone between the die orifices of square configuration when the distance between the orifices is equal to the diameter of the orifices.

It is normally most convenient to have the bore through the die of circular cross-section but this is not essential and square, rectangular or other cross-sections can be used.

It is normally convenient to have the diameter of the bore in each die the same but again, it is not essential to do so and where the bore in the dies is of different size, the spacing between the orifices of the die bores should be calculated with reference to the average diameter of the two bores.

The size of the die bore in absolute terms is not critical. The size of the bore can be selected simply with reference to the ultimate use to which the oriented material is to be put. Thus, when it is desired to produce rods of oriented material, the die bore may be circular or square in cross-section and have a diameter of 5–50 mms. or more. On the other hand, when it is desired to produce fibres of the oriented material and the material leaving the orientation zone is to be subjected to further stretching or drawing, the diameter may be 0.5–5 mms. or less.

Although the discussion above is directed to the use of a pair of opposed dies to produce two opposed streams from the orientation zone, it is possible to remove the fluid from the orientation zone in more than two streams and this can be done by removing the fluid in several pairs of opposed streams or even, in certain circumstances, by having two parallel streams of fluid counter-balanced by a single stream moving in an opposite direction. When the fluid is to be removed in several pairs of opposed streams using several pairs of opposed dies, these dies can be arranged with their orifices on a common sphere.

We also find that it is possible to produce the same type of flow patterns in an orientation zone which is bounded by two pairs of opposed rollers spaced apart from one another where the fluid containing the particles to be oriented is introduced into the zone between a first pair of rollers and between a second pair of rollers and where the fluid is removed from the orientation zone between one of the first pair of rollers and the adjacent roller of the second pair of rollers and between the other roller of the first pair of rollers and the adjacent roller of the second pair of rollers.

It is desirable that each pair of rollers be symmetrical both in relation to each roller of the pair and each roller of the opposite pair, in other words, that the rollers all be mounted on parallel axes, that they be of similar diameter and that the rollers all be equi-distant from one another, in other words, that the centres of the four rollers be on the four corners of a square. However, the orientation effect is also achievable with asymmetric configurations of the four rollers, e.g. by having their centres at the corners of any rhombus or by the use of non-parallel axes for the rollers. Parallel axis or non-parallel axis configurations in which the distances between adjacent rollers are unequal are also possible.

The exact size of the rollers and their spacing apart is not critical and similar considerations apply to this embodiment as apply to the dimensioning in the die embodiment.

Once again, as with the die embodiment, it is not essential to introduce or to remove the fluid to or from the orientation zone in two streams and by appropriate modification of the number of rollers and their positioning, it is possible to introduce or to remove the fluid to or from the orientation zone in one or more than two-streams. In addition to the four roller configuration, other multiple roller configurations in which adjacent rollers rotate with opposite senses also generate extensional flow fields. For example, 6 rollers with centres located at the corners of a hexagon or 8 rollers with centres located at the corners of an octagon can be used.

Adoption to the die technique or roller technique will normally be governed by whether it is desired to produce the oriented material in rod or tube form, in which case the die technique should be used, or in sheet or film form, in which case the roller should be used.

The speed of introducing and removing the fluid from the orientation zone depends primarily on the nature of the fluid to be oriented and the method used for channelling the fluid into the entry stream or streams and for removal from the zone.

In principle, the method of the present invention is applicable to the orientation of any asymmetrically shaped particles carried in a flowing matrix phase. One area of great practical importance is the orientation of two-phase glass. Many glasses are now available which will crystallise. One such glass is manufactured by the Corning Glass Works and coded Corning 119 SCR which is a glass crystallising to a glass-ceramic containing fluorophlogopite, a mica, as the principal crystalline phase. The crystallised glass is available as Corning Code 9658. Another such glass is Corning 119 MCY which also crystallises to a glass-ceramic where fluoromagnesio-richterite, an asbestos, is the principal crystalline phase. These mica and asbestos particles are asymmetrically shaped and, by causing them to have a preferred orientation in the crystallised product, an anisotropic glass-ceramic can be obtained having exceptionally good mechanical properties. These materials, after extrusion into oriented rods can be drawn by conventional fibre drawing techniques down to diameters in the range of 10–100 microns to give glass fibres having exceptional mechanical properties.

Corning 119 SCR is commercially available from Corning Glass Works as code number 9658 and is described in their U.S. Patent Specification No. 3689293. Corning 119 MCY is a glass of the type described in Corning Glass Works U.S. Pat. No. 3839056.

In addition to orientating two phase glass of the type mentioned above, the invention can be applied in the manufacture of polarising photo-chromic glasses. The photochromic properties arise from silver halide or other crystals or other particles in the glass. These crystals or particles have shapes approximately to oblate spheroids which can be oriented to give a glass retaining its photo-chromic properties but, in addition, having polarising properties.

A further type of material that can be treated by the process of the invention is a two phase mixture having asymmetrically shaped crystals or other particles embedded in a matrix capable of transmitting wave-lengths longer than those of visible light e.g. more than 100 $\mu$m. Orientation of the crystals or particles can yield a material capable of polarising radiations of these longer wavelengths.

Another area of application of the invention is in the manufacture of polycrystalline lasers. At the moment, certain laser materials can be grown only in the form of very small crystals. By dispersing these small laser crystals in a transparent matrix, usually glass, and orienting the crystals in the matrix, light amplification can be obtained corresponding to that obtainable from a long single crystal laser.

A still further area of application of the invention is in the production of crystallized mica glass-ceramic sheets. Randomly crystallised sheets have fracture surface energies which are remarkably high for ceramics e.g. 40,000 ergs/cm$^2$ for Corning 9654. This glass is commercially available from Corning Glass Works and is described in their U.S. Pat. No. 3689293. Production of oriented sheets of these materials by the roller technique described exhibit marked anisotropy in fracture surface energy with considerably larger fracture surface energies for fractures propagating perpendicular to the plane of the sheet, the cleavage planes of the mica crystals being oriented parallel to the sheet.

A still further area of application of the invention is in the manufacture of aligned short fibre composites e.g. intimately mixed short fiber hybrid composites. Unidirectional continuous fibre hybrid composites are manufactured by laying plies of one fibre species on top of plies of the other fibre species, i.e. the fibres are unmixed parallel to the plane of the plies.

The present invention can also be applied to other materials having orientable asymmetrically shaped particles such as the so-called "superalloy" materials, which are nickel-based solid solutions containing aluminium, the orientable asymmetrically shaped particles either being or being derived from the nickel/aluminium compound Ni$_3$Al.

The process of the present invention can also be used to manufacture oriented short fibre composites e.g. asbestos fibres in a matrix of metal, to give articles of high uni-axial strength and high ductility; and asbestos fibres in a matrix of plastic. Application of the process to ferrite or other crystals can give rise to microstructures suitable for use as micro-wave transmitters, the present invention representing an alternative method of securing such micro-structures compared to existing electrical methods.

In addition to orienting purely inorganic materials, the method of the present invention can also be used to orient particles carried by organic matrices and in this connection reference is made to the treatment of plastic materials containing bismuth telluride, to the treatment of pitch to orient the graphite particles and to the treatment of organic polymers. While reference has been made so far only to the treatment of liquids, the present method is applicable to the treatment of any fluid material including gases containing orientable asymmetrically shaped particles.

Reference will now be made to FIGS. 1, 2 and 3 of the accompanying drawing which illustrates apparatus in which the method of the invention can be carried out.

Figure 1:
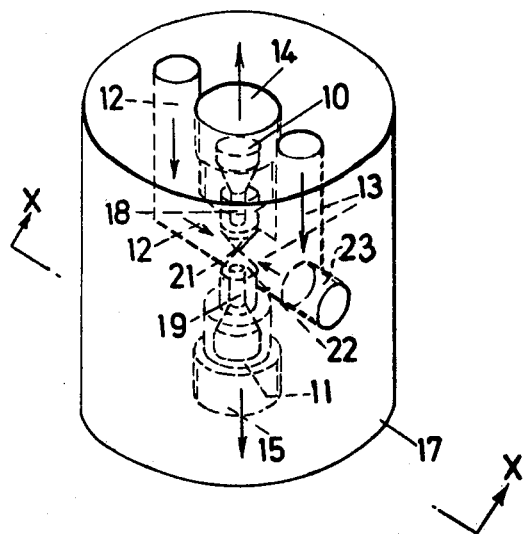
FIG. 1 shows an isometric drawing of an extrusion press and FIG. 2 shows a vertical section taken on line XX through the line of centres of the dies.
Figure 2:
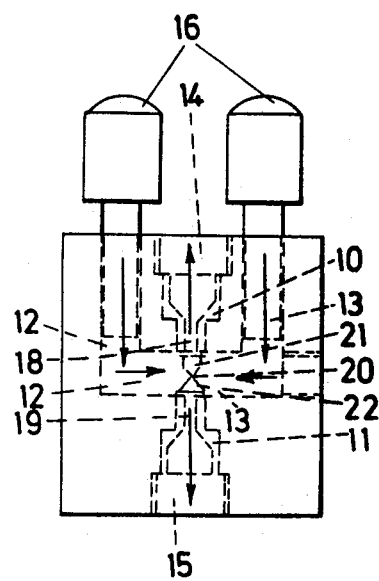

Referring first to FIGS. 1 and 2:

The apparatus comprises generally two die retaining plugs 10 and 11, holding dies 21 and 22, inlet conduits 12 and 13, and outlet conduits 14 and 15. The horizontal section of conduit 13 is sealed with a removable plug 23. Pistons 16 are located to generate pressure in inlet conduits 12 and 13. Dies 21 and 22 each contain a central bore 18 and 19 respectively, which are located on a common axis, and which lead to outlet conduits 14 and 15. Dies 21 and 22 each partially penetrate inlet conduits 12 and 13 and the orifices of the dies are spaced apart by a distance substantially equal to their diameters leaving orientation zone 20 between them. As is apparent from the drawing the centre lines of the horizontal portions of each of inlet conduits 12 and 13 are on a common axis and intersect at a central point in orientation zone 20. The penetration of dies 21 and 22 into the inlet conduits 12 and 13 forces the two streams of opposite-flowing fluid into narrow, axial channels in each of conduits 12 and 13 such that at the intersection of the centerlines of those conduits the streams meet under extremely high biaxial pressure and the velocity of those streams falls to zero. The fluid at the intersection then is removed via central bores 18 and 19 to the zone of lower pressure in the dies 21 and 22 and thence to outlet conduits 14 and 15. The whole apparatus is located inside an electrical induction furnace (not shown) and between the cross-head and baseplate of a mechanical testing machine (not shown).

The temperature in the apparatus is measured using an optical pyrometer (not shown).

The apparatus is charged by introducing glass rods into conduits 12 and 13, the horizontal glass rod being countersunk where necessary to permit the partial penetration of the dies into the feed conduits 12 and 13. The whole apparatus is then heated, by induction heating, to a temperature which is sufficient to make the glass flow when subjected to pressure and pressure is put on the molten glass by the pistons 16 which force the molten glass into the orientation zone 20 and then through the orifices of bores 18 and 19. A thin stream of molten oriented fluid is then withdrawn through outlet conduits 14 and 15, and, after cooling, can be subjected to mechanical testing.

Figure 3:
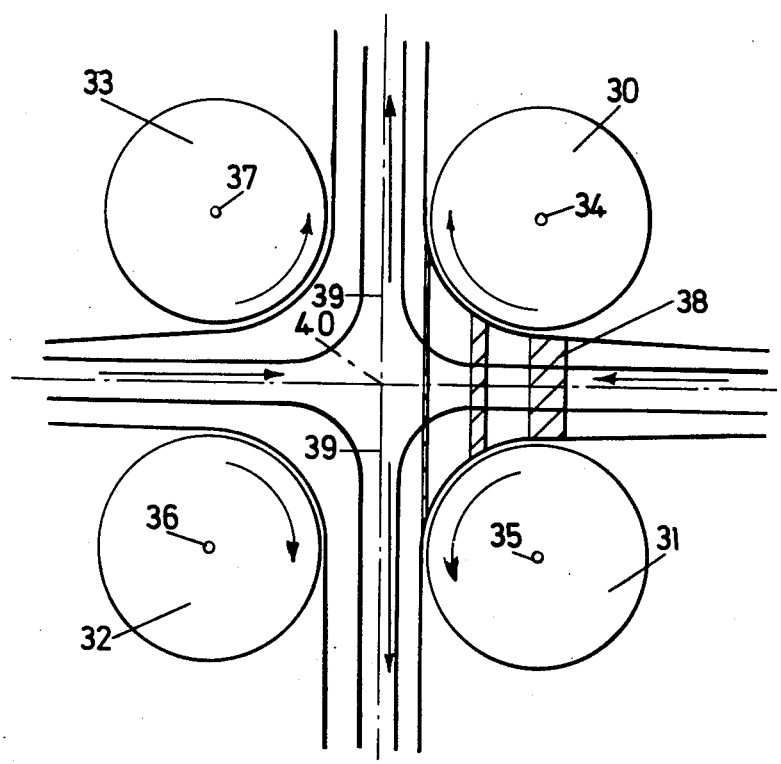
FIG. 3 shows, in front elevation, a roller arrangement.

FIG. 3 shows a suitable arrangement in front elevation in which rollers 30,31, 32 and 33 can rotate about axes 34, 35, 36 and 37 respectively, in the directions shown by the arrows. The four rollers are of identical diameter and are symmetrically located with respect to one another. The orientation zone 39 is formed between rollers 30,31,32 and 33 and the centre of symmetry 40 of the orientation zone is the point at which there is substantially no molecular movement. Fluid 38 to be oriented can be introduced into zone 39 through the space between rollers 30 and 31 and through the space between rollers 32 and 33. The two fluid streams impinge upon one another in zone 39 and leave zone 39 through the space between rollers 30 and 33 respectively and the space between rollers 31 and 32 respectively. Operating in this manner brings about the desired extensional flow of the matrix molecules parallel to the direction of the exit streams.

The following Examples are given to illustrate the invention:

EXAMPLE 1

This Example was carried out in apparatus as illustrated in FIGS. 1 and 2. The container, ram, conduits and die retaining plugs were all machined from stainless steel while the dies themselves were made of pyrolytic graphite. The glass used was Corning 119 SCR available from Corning Glass Works as Corning Code 9658 and cast glass billets were introduced into the inlet conduits. Dimples for locating the dies were previously machined into the horizontal glass billet with an ultrasonic tool. The whole apparatus was heated in the induction furnace and pressure applied on the pistons to extrude, at 950° C. a pair of 1 mm. diameter rods of glass using an inter-die strain rate of 165 seconds$^{-1}$. A partially crystallised glass-ceramic material was produced. This was examined by Laue transmission X-ray diffraction and polished and etched transverse sections were examined by scanning electron microscopy. These tests show that the fluorophlogopite plates are strictly aligned parallel to the direction of the extrusion. It was found that the fluorophlogopite crystals were the monoclinic 1 M polymorph and not the hexagonal 3T form previously reported.

The extruded rods of oriented material were drawn by conventional fibre drawing techniques to diameters of 50 microns or less and further examination of the type mentioned above showed that the orientation of the fluorophlogopite crystals was maintained in these drawn fibres which had a diameter approximately 5 times the diameter of the fluorophlogopite crystals.

Annealing of the oriented material at 950° C. brought about complete crystallisation when nucleation of unoriented crystals occurred.

Certain of the mechanical properties of the oriented material obtained by the procedure described above were measured and compared with the properties of the green glass, i.e. before orientation and crystallisation, and with a randomly crystallised glass which is commercially available. The following results were obtained:

| Material | Volume Fraction of Principal Crystalline phase | Young's Modulus (Mbar) |
| --- | --- | --- |
| Green Glass | 0 | 0.58 |
|  |  | 0.61 |
| Oriented Glass | 7.5 × 10$^{-3}$ | 0.53 |
|  |  | 0.63 |
|  |  | 0.81 |
| Fully randomly crystallised glass (Corning Code 9658) | 0.6 (Published figure) | 0.59 |
|  |  | 0.62 |
|  |  | 0.68 |

Crystal orientation also produces a significant enhancement of fracture stress. For example, a 10$^{-2}$ volume fraction of mica crystals aligned parallel to the axis of a 1 mm. diameter rod increases the tensile strength from 0.22 Kbar for green glass to 0.61–0.74 Kbar. This compares with 0.69 Kbar for a 0.5 volume fraction of randomly oriented crystals.

Knoop micro-hardness indentations on polished transverse and longitudinal sections of the oriented extruded 1 mm. glass rod reveals a factor of nearly 2 difference in indentation length. Using a 100 g. load in a GKN micro-hardness tester, indentations of 0.15±0.08 mm. long were obtained in transverse sections compared with 0.26±0.06 mm. in longitudinal sections, the latter being irrespective of indenter orientation. The residual glass has a high boron content and is likely to have an open structure. Assuming that, as a consequence, it is amenable to compaction when subjected to a hydrostatic pressure, the hardness observations should be interpreted in terms of a resistance to compaction parallel to the mica plate orientation.

EXAMPLE 2

The procedure described in Example 1 was repeated using a mixture of asbestos fibres, obtained from Turner Brothers and Newall, and granules of S-glass obtained from Fibreglass Limited. S-Glass is described on page 307 of "Modern Composite Materials" edited by Broutman and Crock, published in U.S.A. in 1967 by Addison-Wesley Publishing Company Limited. It is also described in U.S. Pat. No. 3,402,055 which indicates that it has a composition in the range 55.0 to 79% $SiO_2$, 12.6 to 32.0% $Al_2O_3$ and 4.0 to 20.0% MgO. The press was heated to 1000° C. and pressure applied to the rams to extrude 1 mm diameter rods at an inter-die strain rate of 170 sec$^{-1}$. After cooling, the rods were examined by optical microscopy and by Laue transmission X-ray diffraction. A substantial alignment of the fibres parallel to the direction of extrusion was observed.

EXAMPLE 3

The procedure described in Example 1 was repeated using cast billets of a Corning glass 119 MCY and extruding the glass at 1,000° C. at an inter-die strain rate of 165 seconds$^{-1}$. Examination of the glass by the methods mentioned in Example 1 indicates that the rods of fluormagnesio-richterite are aligned substantially parallel to the direction of extrusion. The fluoramphiboles are acicular crystals with monoclinic structure and, although the crystals are small, the acicular habit is revealed, the aspect ratio being about 5:1. The mechanical properties of the glass, compared with the green glass and with the randomly crystallised glass are as follows:

| Material | Volume Fraction of Principal Crystalline phase | Young'Modulus (Mbar) |
|---|---|---|
| Green Glass | 0 | 1.20 |
| | | 1.25 |
| Oriented crystallised glass | approximately $3 \times 10^{-2}$ during extrusion + 0.65 during subsequent annealing at 1,000° C. | 1.43* |
| | | 1.74* |
| Randomly crystallised | approximately 0.7 | 1.25 |
| | | 1.25 |
| | | 1.66 |

*As the applied stress is increased, the non-crystalline material crumbles and the slope of the stress v. strain curve decreases smoothly until fracture occurs at a stress of the order of 100 bars.

EXAMPLE 4

The procedure described in Example 1 was repeated using apparatus as illustrated in FIGS. 1 and 2 in which the dies were machined from mild steel. The extrusion press was loaded with a mixture of partially cured polyester resin 868 and asbestos fibres supplied by Turner Brothers and Newall. Resin 868 is based upon polyesters of maleic and phthalic acids and is available commercially from British Industrial Plastics Limited of Manchester, England. Pressure was applied to the pistons at ambient temperature and a pair of 1 mm diameter rod extruded at an inter-die strain rate of 160 sec$^{-1}$. Laue transmission X-ray diffraction revealed strict alignment of the asbestos fibres parallel to the direction of extrusion.

What is claimed is:

1. A method of orienting asymmetrically shaped particles suspended in a fluid, comprising the steps of: forcing a first stream of said fluid, under pressure, into a first conduit and forcing a second stream of said fluid, under pressure, into a second conduit in a direction opposite to said first stream, said conduits having parallel centerlines on a common axis; forcing the streams of said fluids into narrow, axial channels in each of said conduits, at the intersection of the said centerlines, such that said opposite-flowing axial streams meet at the intersection of centerlines under high biaxial pressure and such that the velocity of said streams falls to zero at said intersection; and removing said fluid from said intersection to a zone of lower pressure through a narrow bore, thereby subjecting said fluid to extensional flow under high strain rate and orienting the asymmetrically shaped particles in said fluid.

2. A method according to claim 1 wherein the said fluid leaves the said intersection of centerlines in two streams moving in opposite directions through the bores of a pair of dies whose centerlines are located on a common axis perpendicular to the said common axis of the first and second conduits.

3. A method according to claim 2 wherein the distance between the orifices of the bores of the said dies is 0.1 to 2 times the diameter of the bores of the dies.

4. A method according to claim 1 wherein the fluid is a two phase glass which crystallises to a glass-ceramic.

5. A method according to claim 1 wherein the fluid is a glass containing asbestos fibres.

6. A method according to claim 1 wherein the fluid is a polyester containing asbestos fibres.

7. A method according to claim 1 wherein said first stream is forced between a first pair of opposed rollers and said second stream is forced between a second pair of opposed rollers spaced apart from said first pair of opposed rollers, and said fluid is removed from said intersection to the zone of lower pressure through a first narrow bore located between one of the first pair of rollers and an adjacent roller of the second pair of rollers and a second narrow bore located between the other roller of the first pair of rollers and an adjacent roller of the second pair of rollers.

8. A method according to claim 7 wherein the two pairs of opposed rollers are mounted on parallel axes, the rollers are all of equal diameter and the axes are located at the corners of a square.

9. A method according to claim 1 wherein the fluid comprises a glass matrix phase containing asymmetrically shaped particles of silver halide.

10. A method according to claim 1 wherein the fluid is a glass containing crystals or particles exhibiting photochromic properties with crystals or particles, on being subjected to extensional flow, assume extended shapes that are oriented to give a glass with photochromic properties and polarising properties.

* * * * *